(12) United States Patent
Lu et al.

(10) Patent No.: US 9,513,866 B2
(45) Date of Patent: Dec. 6, 2016

(54) NOISE CANCELLATION WITH ENHANCEMENT OF DANGER SOUNDS

(71) Applicant: Intel Corporation, Santa Clara, CA (US)

(72) Inventors: Mei Lu, Portland, OR (US); Jonathan J. Huang, Pleasanton, CA (US); Stephen E. Rich, Portland, OR (US); Noah Fishel, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 54 days.

(21) Appl. No.: 14/583,264

(22) Filed: Dec. 26, 2014

(65) Prior Publication Data
US 2016/0188284 A1  Jun. 30, 2016

(51) Int. Cl.
*H04R 1/10* (2006.01)
*G06F 3/16* (2006.01)
*H04R 5/04* (2006.01)

(52) U.S. Cl.
CPC ............ *G06F 3/165* (2013.01); *H04R 1/1091* (2013.01); *H04R 5/04* (2013.01); *H04R 2499/11* (2013.01)

(58) Field of Classification Search
None
See application file for complete search history.

(56) References Cited

U.S. PATENT DOCUMENTS

| | | | |
|---|---|---|---|
| 8,804,974 B1 * | 8/2014 | Melanson | H03G 3/32 381/57 |
| 2015/0222977 A1 * | 8/2015 | Angel, Jr. | H04R 1/105 381/74 |
| 2015/0358718 A1 * | 12/2015 | Kaller | G08G 1/0965 381/56 |

FOREIGN PATENT DOCUMENTS

| | | |
|---|---|---|
| KR | 10-2007-0070812 A | 7/2007 |
| KR | 20-2008-0000095 U | 1/2008 |
| KR | 10-2009-0048853 A | 5/2009 |
| KR | 10-1093847 B1 | 12/2011 |
| KR | 10-2014-0120618 A | 10/2014 |

OTHER PUBLICATIONS

International Search Report and Written Opinion for International Patent Application No. PCT/US2015/067276, dated May 4, 2016, 12 pages.

* cited by examiner

*Primary Examiner* — Andrew L Sniezek
(74) *Attorney, Agent, or Firm* — Jordan IP Law, LLC

(57) ABSTRACT

Systems and methods may provide for determining a usage context of a headset and detecting one or more danger-related conditions based on the usage context. Additionally, one or more settings of the headset may be adjusted in response to at least one of the one or more danger-related conditions. In one example, adjusting the one or more settings includes one or more of deactivating noise cancellation, adjusting noise cancellation to increase an intensity of at least one of the one or more danger-related sounds, or adjusting one or more audio playback settings associated with the headset.

24 Claims, 3 Drawing Sheets

NOISE CANCELLATION WITH ENHANCEMENT OF DANGER SOUNDS

TECHNICAL FIELD

Embodiments generally relate to the detection of danger in various device usage contexts. More particularly, embodiments relate to automatically adapting device behavior to detected danger.

BACKGROUND

Consumers may use headphones to listen to music, conduct telephone conversations, or play other audio sounds while in a wide variety of settings, wherein the use of headphones in some settings may be dangerous. For example, headphones may prevent the wearer from hearing other vehicles when the wearer is running, riding a motorcycle and/or cycling near traffic or a road intersection. Moreover, the use of conventional noise cancellation technology in headphones may increase the risk of collisions with other vehicles.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
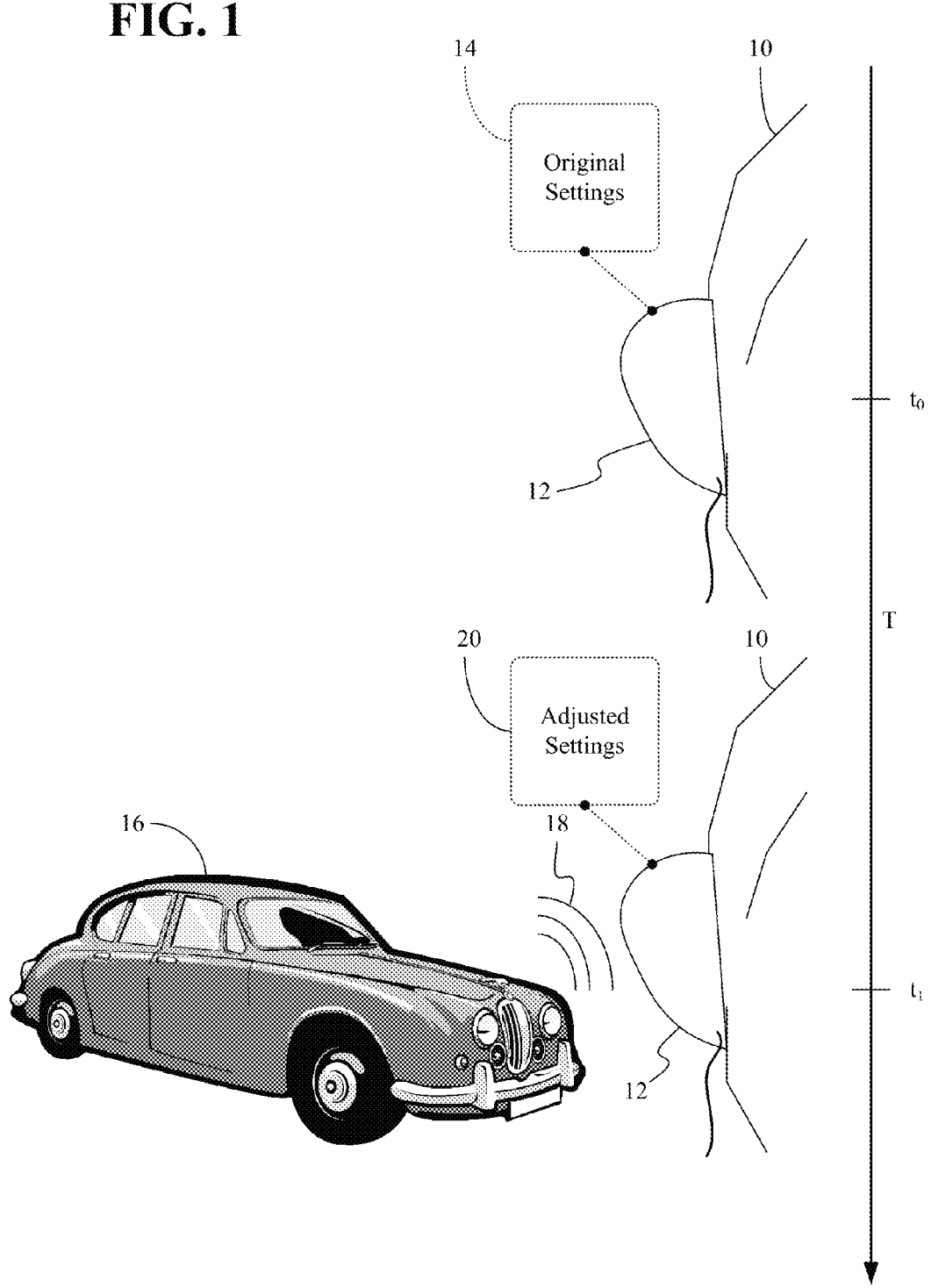
FIG. 1 is an illustration of an example of a headset safety scenario according to an embodiment.

Turning now to FIG. 1, a headset safety scenario is shown in which an individual 10 wears a headset 12 having original settings 14 at time to. The headset 12 may generally have an enclosure with a wearable form factor such as, for example, an over-ear form factor (as shown), on-ear form factor, in-ear form factor (e.g., earbuds), eyewear form factor (e.g., glasses with an earwear component), headwear form factor (e.g., hat, helmet, scarf and/or headband with an earwear component) and so forth. Moreover, the headset 12 may be used to deliver an audio signal (e.g., music, telephone call sound, recorded sound) to the ears of the individual 10. In such a case, the original settings 14 may enhance the audio quality of the audio signal by offsetting ambient sound waves in the audible spectrum that may otherwise interfere with the audio signal. The headset 12 may also be used to protect the ears of the individual 10 from loud and/or harmful sound waves (e.g., industrial and/or manufacturing environment noise). In such a case, the original settings 14 may silence virtually all energy in the audible spectrum.

In the illustrated example, at time ti, a potentially harmful object 16 (e.g., a vehicle) comes within physical proximity of the individual 10. The headset 12 may generally determine the usage context of the headset 12 and detect one or more danger-related conditions based on the usage context. More particularly, the illustrated headset 12 detects one or more danger-related sounds 18 (e.g., engine, horn and/or siren sounds) and automatically generates adjusted settings 20 in response to at least one of the one or more danger-related sounds. As will be discussed in greater detail, the usage context may also be determined based on signals from other components such as, for example, location sensors, speed sensors, or other activity sensors. The adjusted settings 20 may, for example, deactivate noise cancellation altogether or adjust noise cancellation to increase an intensity of one or more danger-related sounds. For example, traffic noise might be amplified in the adjusted settings 20 so that the individual 10 is made aware of the presence of the potentially harmful object 16. Other device behaviors may also be automatically adapted to detected danger. Thus, the individual 10 may, for example, move away from traffic lanes and/or look towards the potentially harmful object 16 as a physical safety measure.

Figure 2:
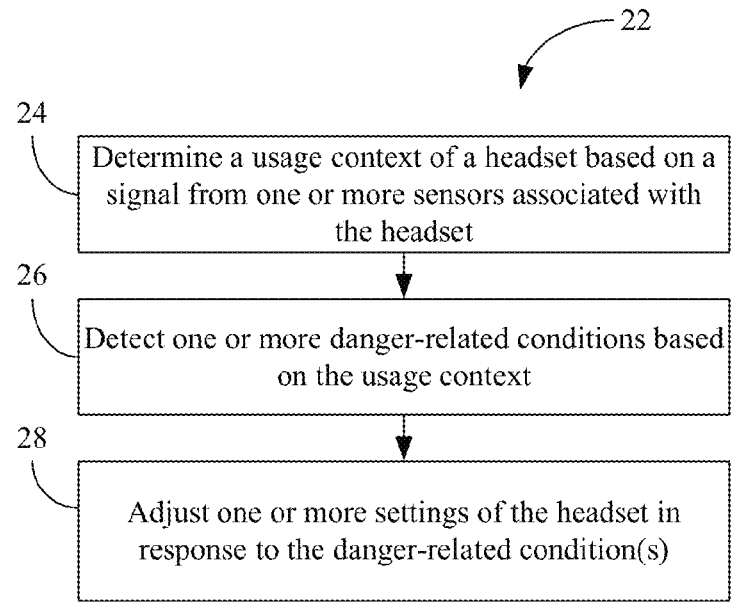
FIG. 2 is a flowchart of an example of a method of operating a headset according to an embodiment.

Turning now to FIG. 2, a method 22 of operating a headset such as, for example, the headset 12 (FIG. 1), is shown. The method 22 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in method 22 may be written in any combination of one or more programming languages, including an object oriented programming language such as JAVA, SMALL-TALK, C++ or the like and conventional procedural programming languages, such as the "C" programming language or similar programming languages.

Illustrated processing block 24 provides for determining a usage context of a headset based on a signal from one or more sensors associated with the headset. For example, a microphone signal may be generated by any type of microphone that is configured to capture ambient sound waves (e.g., an integrated microphone directed outward from the headset or an external microphone hanging from a wire of the headset). Additionally, an accelerometer (e.g., speed and/or motion sensor) might generate a speed signal, a location sensor (e.g., Global Positioning System/GPS receiver) may generate a location signal, etc., wherein one or more of the signals may be used to determine the usage context. One or more danger-related conditions may be detected at block 26 based on the usage context, wherein the danger-related conditions may correspond to, for example, traffic, sirens, automotive horns, etc., or any combination thereof. Block 26 may include conducting a feature extraction analysis such as, for example, a mel-frequency cepstral coefficient (MFCC) analysis on a microphone signal in which the frequency spectrum contained in the microphone signal is simplified through the use of frequency bands that are equally spaced on the mel scale. In general, the mel scale may approximate the human auditory system's response more closely than the linearly-spaced frequency bands used in the normal cepstrum. Other feature extraction analysis techniques may also be used, depending on the circumstances.

The results of the feature extraction analysis may in turn be used to conduct a classification analysis such as, for example, a Gaussian mixture model (GMM) or a hidden Markov model (HMM) analysis in order to determine whether any danger-related sounds are contained in the microphone signal. For example, the classification analysis might output a likelihood score for each known type of danger-related sound, wherein likelihood scores that are above a particular threshold may trigger a positive detection of the corresponding danger-related sounds in question.

Illustrated block 28 adjusts one or more settings of the headset in response to the detected danger-related sounds. Block 28 may include, for example, deactivating noise cancellation, adjusting noise cancellation to increase the intensity of the detected danger-related sounds, and so forth. Additionally, one or more audio playback settings associated with the headset may be optionally adjusted at block 28 in response to the danger-related sounds. Such a solution may be relevant in audio listening scenarios such as music, telephone sound and/or recording playback scenarios. Thus, block 28, may also include, for example, superimposing a safety notification on the audio playback signal, reducing the intensity of the audio playback signal and/or modifying the delivery timing (e.g., training feedback delivered earlier or later) of the audio playback signal.

Figure 3:
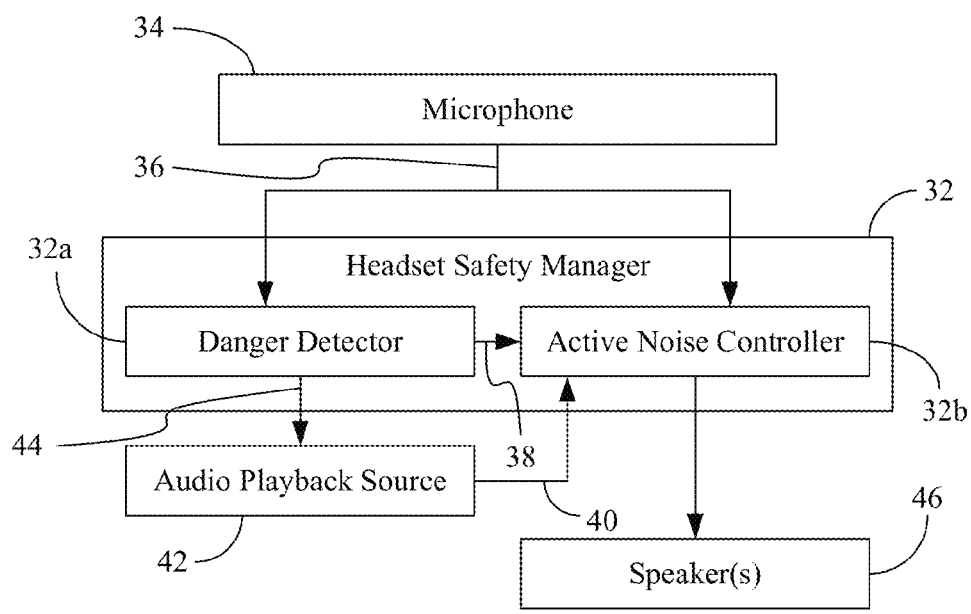
FIG. 3 is a block diagram of an example of a logic architecture according to an embodiment.

Turning now to FIG. 3, a logic architecture 32 (e.g., "logic", 32a-32b) is shown, wherein the logic architecture 32 may generally function as a headset safety manager. In the illustrated example, a danger detector 32a receives a signal such as, for example, a microphone signal 36 from a microphone 34 associated with a headset. As already noted, other signals such as, for example, location sensor signals, speed sensor signals, and other activity sensors may be received by the danger detector 32a. The danger detector 32a may also detect one or more danger-related conditions based on the microphone signal 36, wherein the danger detector 32a may, for example, conduct an MFCC analysis of the microphone signal and conduct one or more of a GMM analysis or an HMM analysis based on the MFCC analysis, as already discussed.

The illustrated logic architecture 32 also includes an active noise controller 32b that receives the microphone signal 36 and a classification output 38 from the danger detector 32a. The classification output 38 may identify one or more danger-related sources and/or corresponding frequency spectrum energy, wherein the active noise controller 32b may adjust one or more settings of the headset in response to one or more danger-related sounds. As already noted, adjusting the settings might involve deactivating noise cancellation altogether, adjusting noise cancellation to increase the intensity of the danger-related sounds (e.g., deactivating cancellation of the corresponding frequency spectrum energy), and so forth. The adjustment to the settings may be temporary (e.g., while the danger-related sounds are present).

The active noise controller 32b may also optionally receive an audio signal 40 from an audio playback source 42 (e.g., codec, local memory, network controller connected to a streaming source, etc.), wherein the audio signal 40 may include, for example, music, telephone call audio/sound, recorded sound/messages, and so forth. In such a case, the active noise controller 32b may also adjust one or more audio playback settings associated with the headset in response to one or more of the danger-related sounds. As already noted, adjusting the audio playback settings might involve superimposing a safety notification 44 (e.g., recorded "beware" message) on the audio playback signal 40, reducing the intensity of the audio playback signal 40, modifying the delivery timing of the audio playback signal 40, and so forth. In the illustrated example, the safety notification 44 is provided from the danger detector 32a to the audio playback source 42, although the safety notification 44 may be superimposed by the active noise controller 32b or any other suitable component between the audio playback source 42 and one or more speakers 46 of the headset.

Figure 4:
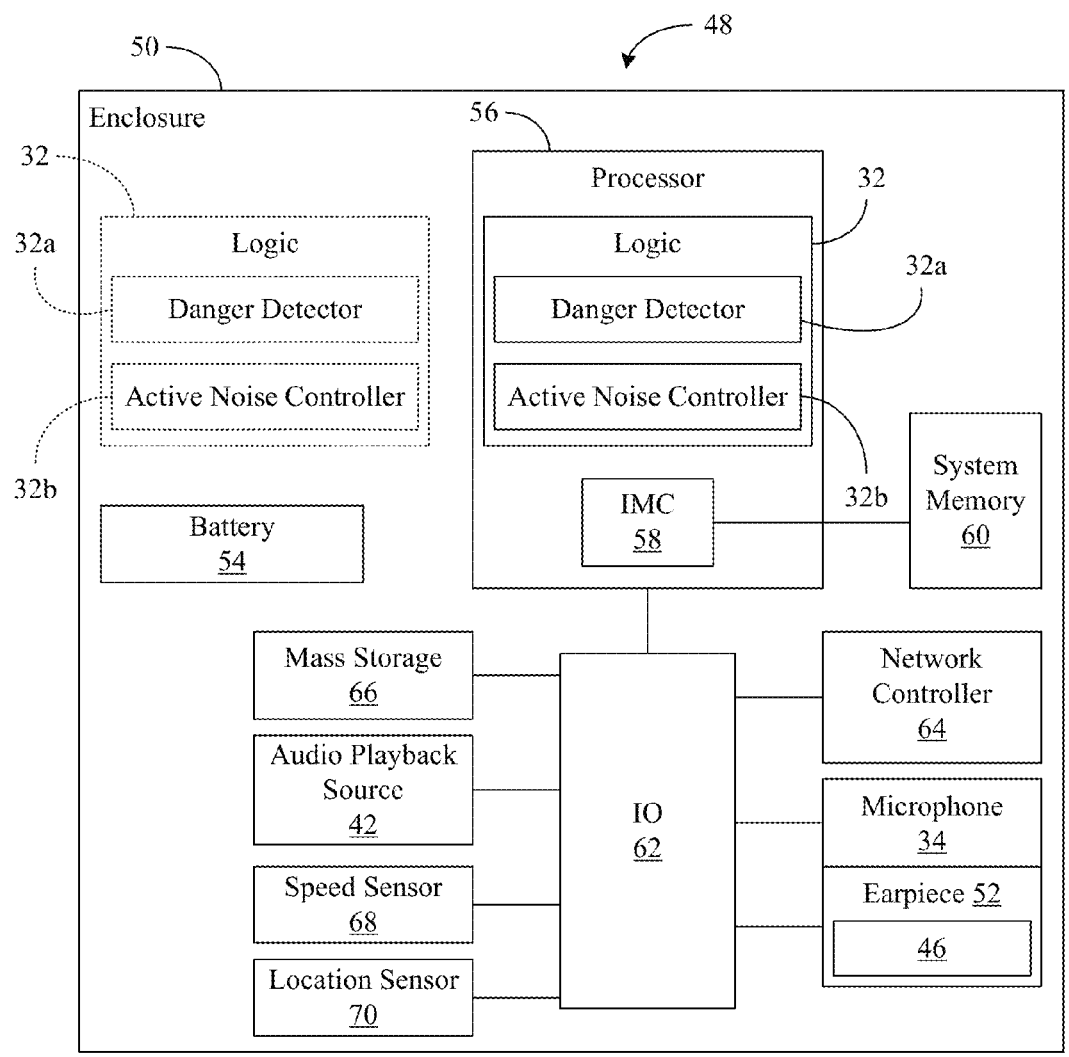
FIG. 4 is a block diagram of an example of a device according to an embodiment.

FIG. 4 shows a headset 48. In the illustrated example, the headset 48 includes an enclosure 50 including one or more earpieces 52 having the speakers 46 and a wearable form factor such as, for example, an over-ear form factor (as shown in FIG. 1), on-ear form factor, in-ear form factor (e.g., earbuds), eyewear form factor (e.g., glasses with an earwear component), headwear form factor (e.g., hat, helmet, scarf and/or headband with an earwear component) and so forth. The headset 48 may also include the microphone 34, which may be embedded in or otherwise coupled to the earpieces 52, a battery 54 to supply power to the headset 48 and a processor 56 having an integrated memory controller (IMC) 58, which may communicate with system memory 60 (e.g., random access memory/RAM).

The illustrated headset 48 also includes a input output (IO) module 62, that functions as a host device and may communicate with, for example, a speed sensor 68 (e.g., accelerometer), a location sensor 70 (e.g., GPS receiver), a network controller 64, the audio playback source 42, the microphone 34, the earpiece 52 and mass storage 66 (e.g., flash memory). The illustrated processor 56 may execute the logic architecture 32 that is configured to determine a usage context of the headset 48 based on a signal from one or more of the microphone 34, the location sensor 70 or the speed sensor 68, detect one or more danger-related conditions based on the microphone signal, and adjust one or more settings of the headset 48 in response to at least one of the one or more danger-related sounds, as already discussed. Moreover, the logic architecture 32 may adjust one or more audio playback settings associated with the headset 48 in response to at least one of the one or more danger-related conditions. The logic architecture 32 may optionally be implemented external to the processor 56. Additionally, the processor 56 and the JO module 62 may be implemented together on the same semiconductor die as a system on chip (SoC).

Thus, for example, the logic 32 might automatically detect that the user has been running or cycling (e.g., based on speed sensor signals) and that the user is at road intersection with traffic lights (e.g., based on location sensor signals). The logic 32 deem such a scenario to be a danger-related condition, wherein, in response to the danger-related condition, the logic 32 may automatically reduce the music playback level, delay automated training feedback that the user has been listening to, and cancel noise cancellation to ensure the user is aware of the potentially hazardous environment.

ADDITIONAL NOTES AND EXAMPLES

Example 1 may include a safety-enhanced headset comprising an enclosure including one or more earpieces and a wearable form factor, and logic, implemented at least partly in fixed-functionality hardware, to determine a usage context of the headset, detect one or more danger-related conditions based on the usage context, and adjust one or more settings of the headset in response to at least one of the one or more danger-related conditions.

Example 2 may include the headset of Example 1, wherein the logic is to one or more of deactivate noise cancellation, adjust noise cancellation to increase an intensity of at least one of the one or more danger-related sounds, or adjust one or more audio playback settings associated with the headset.

Example 3 may include the headset of Example 2, further including one or more speakers to output an audio playback signal, wherein the logic is to one or more of superimpose a safety notification on the audio playback signal, reduce an intensity of the audio playback signal or modify a delivery timing of the audio playback signal.

Example 4 may include the headset of Example 1, further including one or more of a microphone, a location sensor or a speed sensor to generate a signal, wherein the usage context is to be determined based on the signal.

Example 5 may include the headset of Example 1, wherein the logic is to conduct a feature extraction analysis of a microphone signal; and conduct a classification analysis based on the feature extraction analysis.

Example 6 may include the headset of any one of Examples 1 to 5, wherein at least one of the one or more danger-related conditions is to correspond to one or more of traffic, a siren or an automotive horn.

Example 7 may include a safety management apparatus comprising logic, implemented at least partly in fixed-functionality hardware, to determine a usage context of a headset, detect one or more danger-related conditions based on the usage context, and adjust one or more settings of the headset in response to at least one of the one or more danger-related conditions.

Example 8 may include the apparatus of Example 7, wherein the logic is to one or more of deactivate noise cancellation, adjust noise cancellation to increase an intensity of at least one of the one or more danger-related sounds, or adjust one or more audio playback settings associated with the headset.

Example 9 may include the apparatus of Example 8, wherein the logic is to one or more of superimpose a safety notification on an audio playback signal, reduce an intensity of the audio playback signal or modify a delivery timing of the audio playback signal.

Example 10 may include the apparatus of Example 7, wherein the logic is to receive a signal from one or more of a microphone, a location sensor or a speed sensor, wherein the usage context is to be determined based on the signal.

Example 11 may include the apparatus of Example 7, wherein the logic is to conduct a feature extraction analysis of a microphone signal; and conduct a classification analysis based on the feature extraction analysis.

Example 12 may include the apparatus of any one of Examples 7 to 11, wherein at least one of the one or more danger-related conditions is to correspond to one or more of traffic, a siren or an automotive horn.

Example 13 may include a method of managing safety, comprising determining a usage context of a headset, detecting one or more danger-related conditions based on the usage context, and adjusting one or more settings of the headset in response to at least one of the one or more danger-related conditions.

Example 14 may include the method of Example 13, wherein adjusting the one or more settings includes one or more of deactivating noise cancellation, adjusting noise cancellation to increase an intensity of one or more danger-related sounds, or adjusting one or more audio playback settings associated with the headset.

Example 15 may include the method of Example 14, wherein adjusting the one or more audio playback settings includes one or more of superimposing a safety notification on an audio playback signal, reducing an intensity of the audio playback signal or modifying a delivery timing of the audio playback signal.

Example 16 may include the method of Example 13, further including receiving a signal from one or more of a microphone, a location sensor or a speed sensor, wherein the usage context is determined based on the signal.

Example 17 may include the method of Example 13, wherein detecting the one or more danger-related sounds includes conducting a feature extraction analysis of a microphone signal; and conducting a classification analysis based on the feature extraction analysis.

Example 18 may include the method of any one of Examples 13 to 17, wherein at least one of the one or more danger-related conditions corresponds to one or more of traffic, a siren or an automotive horn.

Example 19 may include at least one computer readable storage medium comprising a set of instructions which, when executed by a safety management apparatus, cause the safety management apparatus to determine a usage context of a headset, detect one or more danger-related conditions based on the usage context and adjust one or more settings of the headset in response to at least one of the one or more danger-related conditions.

Example 20 may include the at least one computer readable storage medium of Example 19, wherein the instructions, when executed, cause the safety management apparatus to one or more of deactivate noise cancellation, adjust noise cancellation to increase an intensity of one or more danger-related sounds, or adjust one or more audio playback settings associated with the headset.

Example 21 may include the at least one computer readable storage medium of Example 20, wherein the instructions, when executed, cause the safety management apparatus to one or more of superimpose a safety notification on an audio playback signal, reduce an intensity of the audio playback signal or modify a delivery timing of the audio playback signal.

Example 22 may include the at least one computer readable storage medium of Example 19, wherein the instructions, when executed, cause the safety management apparatus to receive a signal from one or more of a microphone, a location sensor or a speed sensor, wherein the usage context is to be determined based on the signal.

Example 23 may include the at least one computer readable storage medium of Example 19, wherein the instructions, when executed, cause the safety management apparatus to conduct a feature extraction analysis of a microphone signal; and conduct a classification analysis based on the feature extraction analysis.

Example 24 may include the at least one computer readable storage medium of any one of Examples 19 to 23, wherein at least one of the one or more danger-related conditions is to correspond to one or more of traffic, a siren or an automotive horn.

Example 25 may include a safety management apparatus comprising means for determining a usage context of a headset; means for detecting one or more danger-related conditions based the usage context; and means for adjusting one or more settings of the headset in response to at least one of the one or more danger-related conditions.

Example 26 may include the apparatus of Example 25, wherein the means for adjusting the one or more noise cancellation settings includes one or more of means for deactivating noise cancellation, means for adjusting noise cancellation to increase an intensity of one or more danger-related sounds, or means for adjusting one or more audio playback settings associated with the headset.

Example 27 may include the apparatus of Example 26, wherein the means for adjusting the one or more audio playback settings includes one or more of means for superimposing a safety notification on an audio playback signal, means for reducing an intensity of the audio playback signal or means for modifying a delivery timing of the audio playback signal.

Example 28 may include the apparatus of Example 25, further including means for receiving a signal from one or more of a microphone, a location sensor or a speed sensor, wherein the usage context is to be determined based on the signal.

Example 29 may include the apparatus of Example 25, wherein the means for detecting the one or more danger-related sounds includes means for conducting a feature extraction analysis of a microphone signal; and means for conducting a classification analysis based on the feature extraction analysis.

Example 30 may include the apparatus of any one of Examples 25 to 29, wherein at least one of the one or more danger-related conditions is to correspond to one or more of traffic, a siren or an automotive horn.

Thus, techniques described herein may detect "danger contexts" and selectively control active noise cancellation so that, for example, only annoying road noises and wind sounds are removed. Furthermore, techniques may provide explicit notification, reduce music playback levels and/or enhance outside noises when danger contexts are detected. As a result, the audio and speech related experience may be made substantially more pleasant to the user without compromising road safety.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A headset comprising:
   an enclosure including one or more earpieces and a wearable form factor;
   a Global Positioning System (GPS) receiver; and
   logic, implemented at least partly in fixed-functionality hardware, to:
   determine a usage context of the headset based at least in part on a location signal from the GPS receiver;
   detect one or more danger-related conditions based on the usage context; and
   adjust one or more settings of the headset in response to at least one of the one or more danger-related conditions.

2. The headset of claim 1, wherein the logic is to one or more of deactivate noise cancellation, adjust noise cancellation to increase an intensity of at least one of the one or more danger-related sounds, or adjust one or more audio playback settings associated with the headset.

3. The headset of claim 2, further including one or more speakers to output an audio playback signal, wherein the logic is to one or more of superimpose a safety notification on the audio playback signal, reduce an intensity of the audio playback signal or modify a delivery timing of the audio playback signal.

4. The headset of claim 1, further including one or more of a microphone, or a speed sensor to generate a signal, wherein the usage context is to be determined based on the signal from one or more of the microphone or the speed sensor.

5. The headset of claim 1, wherein the logic is to:
   conduct a feature extraction analysis of a microphone signal; and
   conduct a classification analysis based on the feature extraction analysis.

6. The headset of claim 1, wherein at least one of the one or more danger-related conditions is to correspond to one or more of traffic, a siren or an automotive horn.

7. An apparatus comprising:
   logic, implemented at least partly in fixed-functionality hardware, to:
   determine a usage context of a headset based at least in part on a location signal from a Global Positioning System (GPS) receiver;

detect one or more danger-related conditions based on the usage context; and adjust one or more settings of the headset in response to at least one of the one or more danger-related conditions.

8. The apparatus of claim 7, wherein the logic is to one or more of deactivate noise cancellation, adjust noise cancellation to increase an intensity of at least one of the one or more danger-related sounds, or adjust one or more audio playback settings associated with the headset.

9. The apparatus of claim 8, wherein the logic is to one or more of superimpose a safety notification on an audio playback signal, reduce an intensity of the audio playback signal or modify a delivery timing of the audio playback signal.

10. The apparatus of claim 7, wherein the logic is to receive a signal from one or more of a microphone, or a speed sensor, wherein the usage context is to be determined based on the signal from one or more of the microphone or the speed sensor.

11. The apparatus of claim 7, wherein the logic is to:
conduct a feature extraction analysis of a microphone signal; and
conduct a classification analysis based on the feature extraction analysis.

12. The apparatus of claim 7, wherein at least one of the one or more danger-related conditions is to correspond to one or more of traffic, a siren or an automotive horn.

13. A method comprising:
determining a usage context of a headset based at least in part on a location signal from a Global Positioning System (GPS) receiver;
detecting one or more danger-related conditions based on the usage context; and
adjusting one or more settings of the headset in response to at least one of the one or more danger-related conditions.

14. The method of claim 13, wherein adjusting the one or more settings includes one or more of deactivating noise cancellation, adjusting noise cancellation to increase an intensity of one or more danger-related sounds, or adjusting one or more audio playback settings associated with the headset.

15. The method of claim 14, wherein adjusting the one or more audio playback settings includes one or more of superimposing a safety notification on an audio playback signal, reducing an intensity of the audio playback signal or modifying a delivery timing of the audio playback signal.

16. The method of claim 13, further including receiving a signal from one or more of a microphone, or a speed sensor, wherein the usage context is determined based on the signal from one or more of the microphone or the speed sensor.

17. The method of claim 13, wherein detecting the one or more danger-related sounds includes:
conducting a feature extraction analysis of a microphone signal; and
conducting a classification analysis based on the feature extraction analysis.

18. The method of claim 13, wherein at least one of the one or more danger-related conditions corresponds to one or more of traffic, a siren or an automotive horn.

19. At least one non-transitory computer readable storage medium comprising a set of instructions which, when executed by an apparatus, cause the apparatus to:
determine a usage context of a headset based at least in part on a location signal from a Global Positioning System (GPS) receiver;
detect one or more danger-related conditions based on the usage context; and
adjust one or more settings of the headset in response to at least one of the one or more danger-related conditions.

20. The at least one non-transitory computer readable storage medium of claim 19, wherein the instructions, when executed, cause the apparatus to one or more of deactivate noise cancellation, adjust noise cancellation to increase an intensity of one or more danger-related sounds, or adjust one or more audio playback settings associated with the headset.

21. The at least one non-transitory computer readable storage medium of claim 20, wherein the instructions, when executed, cause the apparatus to one or more of superimpose a safety notification on an audio playback signal, reduce an intensity of the audio playback signal or modify a delivery timing of the audio playback signal.

22. The at least one non-transitory computer readable storage medium of claim 19, wherein the instructions, when executed, cause the apparatus to receive a signal from one or more of a microphone, or a speed sensor, wherein the usage context is to be determined based on the signal from one or more of the microphone or the speed sensor.

23. The at least one non-transitory computer readable storage medium of claim 19, wherein the instructions, when executed, cause the apparatus to:
conduct a feature extraction analysis of a microphone signal; and
conduct a classification analysis based on the feature extraction analysis.

24. The at least one non-transitory computer readable storage medium of claim 19, wherein at least one of the one or more danger-related conditions is to correspond to one or more of traffic, a siren or an automotive horn.

* * * * *